United States Patent
Kim et al.

(10) Patent No.: US 6,898,354 B2
(45) Date of Patent: May 24, 2005

(54) FIBER OPTIC CABLE DEMONSTRATING IMPROVED DIMENSIONAL STABILITY

(75) Inventors: Young Joon Kim, Greenfield, MA (US); Francis A. Gnatek, Hadley, MA (US); Jeffrey S. Doak, Florence, MA (US)

(73) Assignee: Judd Wire, Inc., Turners Falls, MA (US)

( * ) Notice: Subject to any disclaimer, the term of this patent is extended or adjusted under 35 U.S.C. 154(b) by 0 days.

(21) Appl. No.: 10/694,656

(22) Filed: Oct. 27, 2003

(65) Prior Publication Data

US 2004/0109650 A1 Jun. 10, 2004

Related U.S. Application Data

(60) Provisional application No. 60/421,665, filed on Oct. 28, 2002.

(51) Int. Cl.[7] .................................................. G02B 6/44
(52) U.S. Cl. ....................................................... 385/100
(58) Field of Search .................................. 385/100–109

(56) References Cited

U.S. PATENT DOCUMENTS

| | | |
|---|---|---|
| 4,441,787 A | 4/1984 | Lichtenberger |
| 4,510,348 A | 4/1985 | Arroyo et al. |
| 4,515,435 A | 5/1985 | Anderson |
| 4,896,940 A | 1/1990 | Kathiresan et al. |
| 5,002,359 A | 3/1991 | Sayegh |
| 5,074,640 A | 12/1991 | Hardin et al. |
| 5,138,684 A | 8/1992 | Bullock et al. |
| 5,171,635 A | 12/1992 | Randa |
| 5,201,020 A | 4/1993 | Kannabiran |
| 5,214,243 A | 5/1993 | Johnson |
| 5,220,133 A | 6/1993 | Sutherland et al. |
| 5,253,318 A | 10/1993 | Sayegh et al. |
| 5,504,830 A | 4/1996 | Ngo et al. |
| 5,539,851 A | 7/1996 | Taylor et al. |
| 5,557,698 A | 9/1996 | Gareis et al. |
| 5,566,266 A | 10/1996 | Navé et al. |
| 5,615,293 A | 3/1997 | Sayegh |
| 5,706,382 A | 1/1998 | Smith |
| 5,731,088 A | 3/1998 | La Court |
| 5,920,671 A | 7/1999 | Smith |
| 6,233,384 B1 | 5/2001 | Sowell, III et al. |
| 6,326,416 B1 | 12/2001 | Chien et al. |
| 6,361,299 B1 | 3/2002 | Quigley et al. |
| 6,362,249 B2 | 3/2002 | Chawla |
| 6,365,072 B1 | 4/2002 | Katoot et al. |
| 6,429,263 B2 | 8/2002 | Hwang et al. |
| 6,439,777 B1 | 8/2002 | Harrison et al. |
| 2003/0059183 A1 * | 3/2003 | Militaru ...................... 385/112 |

FOREIGN PATENT DOCUMENTS

GB     2 214 653 A     9/1989

* cited by examiner

*Primary Examiner*—Javaid H. Nasri
(74) *Attorney, Agent, or Firm*—Holland & Bonzagni, P.C.; Mary R. Bonzagni, Esq.

(57) ABSTRACT

A fiber optic cable that employs a dual layer jacket and that demonstrates improved dimensional stability over a wide temperature range, is provided. In a preferred embodiment, the inventive cable is flame-retardant and, upon flaming, smoke suppressed and non-hazardous.

34 Claims, 2 Drawing Sheets

FIBER OPTIC CABLE DEMONSTRATING IMPROVED DIMENSIONAL STABILITY

RELATED APPLICATION

This application claims priority from U.S. Provisional Patent Application Ser. No. 60/421,665, filed Oct. 28, 2002.

TECHNICAL FIELD OF THE INVENTION

The present invention generally relates to fiber optic cables, and more particularly relates to a fiber optic cable that employs a dual layer jacket demonstrating improved dimensional stability over a wide temperature range. In a preferred embodiment, the inventive cable is flame-retardant and, upon flaming, smoke suppressed and non-hazardous.

BACKGROUND ART

Fiber optic cables are currently being used throughout the aerospace and communications industries. These cables are typically employed in computerized equipment and communications applications where space and/or weight restrictions make traditional copper wiring systems inappropriate. Optical fiber, as a data transfer means, is known for its exceptional speed and bandwidth capability and for its ability to provide reliable communication signals in systems that generate large amounts of electromagnetic radiation.

The commercial and military aerospace industry is a harsh testing ground for fiber optic cables, requiring flawless performance in extremely demanding physical environments. In such environments, where even minor failures can result in loss of life and property, fiber optic cables are subjected to conditions which include destructive extremes in vibration, shock, temperature, pressure, water/chemical emersion, as well as electromagnetic and radio frequency interference. It is for these reasons that aerospace standards for the manufacture and supply of fiber optic cables are some of the most rigorous found in any industry.

The world's major aerospace manufacturers conduct aggressive ongoing research on new designs and materials that can deliver stronger, lighter and more durable fiber optic cables.

U.S. Pat. No. 6,233,384 B1 to Sowell, III et al. provides one such new design. By way of this reference, a ruggedized fiber optic cable is provided wherein a fluoropolymer first jacketing material is applied over a buffered optic fiber core. A rigid, closely-spaced, spirally or helically wrapped wire layer is applied over the first jacketing layer, followed by the application of a mechanical braid (e.g., plastic fibers or strands) over the wire layer. To protect the fiber optic cable from the environment, an outer jacket (e.g., tetrafluoroethylene/(perfluoroalkyl) vinyl ether copolymer) is applied over the mechanical braid. Although this cable design provides some protection for the optic fiber core, the outer jacket will shrink in the axial direction during cable manufacture and use, thereby increasing stress on the optic fiber core, which can cause the fibers to crack or break.

U.S. Pat. No. 5,615,293 to Sayegh discloses a fiber optic cable assembly that employs acrylic coated optical fibers surrounded by a buffer material such as foamed fluorinated ethylene-propylene (FEP). The acrylic coating material on the optical fibers, however, has a use temperature ranging from about −65° C. to about 125° C. and will degrade when the FEP buffer material is extruded onto the fibers, causing undesirable yellowing and even loss of integrity of the coating material.

Accordingly, it is a general object of the present invention to avoid the above-referenced disadvantages of the prior art.

More particularly, it is an object of the present invention to provide a fiber optic cable that serves to minimize or eliminate shrinkage stress on the optic fiber core.

It is a more particular object to provide a fiber optic cable having improved dimensional stability that demonstrates more stable signal carrying characteristics in extremely demanding physical environments.

It is another more particular object to provide a fiber optic cable that employs one or more intermediate layers that serve to protect the buffered optical fiber(s) from the effects of high temperature during cable manufacture and use.

SUMMARY

The present invention therefore provides a fiber optic cable that comprises:

(1) at least one optical fiber;

(2) a primary buffer member circumferentially surrounding each optical fiber;

(3) optionally, a heat insulating and dimensionally stabilizing member circumferentially surrounding the primary buffer member;

(4) a secondary buffer member circumferentially surrounding either the primary buffer member or the heat insulating and dimensionally stabilizing member;

(5) a strength member circumferentially surrounding the secondary buffer member; and (6) a dual layer jacket circumferentially surrounding the strength member, which comprises a heat or pressure sealed, low-shrinkage polymer film inner layer, and an outer protective layer.

The present invention further provides a process for preparing the fiber optic cable described above, which comprises:

(1) forming a primary buffer member on at least one optical fiber;

(2) optionally, forming a heat insulating and dimensionally stabilizing member on the primary buffer member;

(3) forming a secondary buffer member on either the primary buffer member or the heat insulating and dimensionally stabilizing member;

(4) forming a strength member on the secondary buffer member; and (5) forming a dual layer jacket on the strength member by
   a. wrapping a low-shrinkage polymer film in an overlapping fashion along a portion or length of the strength member,
   b. optionally, heating the low-shrinkage polymer film to a temperature sufficient to cause overlapping regions of the film to bond,
   c. forming an outer protective layer on the inner layer, and
   d. optionally, crosslinking the outer protective layer.

Other features and advantages of the invention will be apparent to one of ordinary skill from the following detailed description and accompanying drawings.

Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

Particular features of the disclosed invention are illustrated by reference to the accompanying drawings in which.

BEST MODE FOR CARRYING OUT THE INVENTION

By way of the present invention, it has been discovered that improved dimensional stability in fiber optic cables may be achieved using a dual layer jacket comprising a heat or pressure sealed, low shrinkage polymer film inner layer and an outer protective layer. As alluded to above, dimensional stability (e.g., low axial shrinkage) is one of the most important properties of a fiber optic cable.

The fiber optic cable of the present invention was developed primarily for use in aerospace applications and preferred embodiments thereof comply with the flame spread, smoke, toxicity and out-gassing standards of the aerospace industry. Its application, however, is not limited to aerospace applications, and may, if desired, be used in automotive, vehicular, shipboard and industrial applications, and the like.

Figure 1:
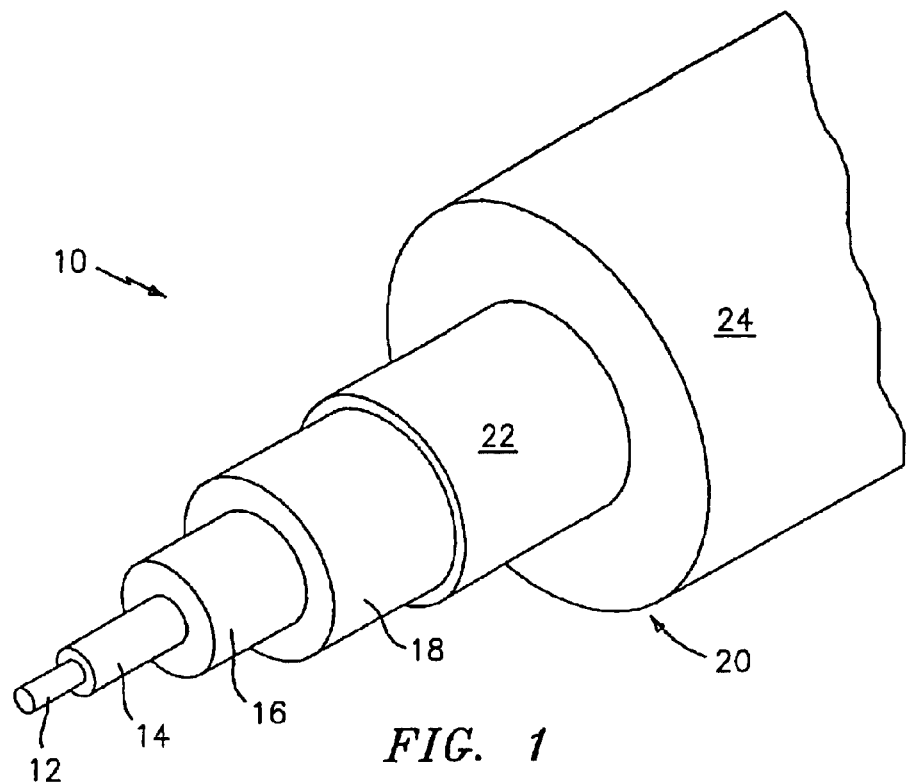
FIG. 1 is a partial side perspective view of the fiber optic cable of the present invention.

Referring now to FIG. 1 in detail, reference numeral 10 has been used to generally designate the fiber optic cable of the present invention. Fiber optic cable basically comprises:

(1) at least one optical fiber 12;

(2) a primary buffer member 14 circumferentially surrounding each optical fiber 12;

(3) a secondary buffer member 16 circumferentially surrounding the primary buffer member 14;

(4) a strength member 18 circumferentially surrounding the secondary buffer member 16; and (5) a dual layer jacket 20 circumferentially surrounding the strength member 18, which comprises a heat or pressure sealed, low-shrinkage polymer film inner layer 22, and an outer protective layer 24.

Optical fibers suitable for use in the present invention are not limited and include glass fibers, plastic or polymer fibers and plastic-clad fibers. Such fibers may take the form of single-mode fibers or multi-mode fibers, with multi-mode fibers being further divided into step-index, multi-mode fibers and graded-index, multi-mode fibers.

A "mode" is defined as a transverse pattern of energy that propagates through an optical fiber at a specific velocity. As the names suggest, single-mode fibers only support a single mode, while multi-mode fibers support a number of modes.

For step-index, multi-mode fibers, the index of refraction (i.e., the ability of a material to bend light) is the same across the entire radius of the fiber core, but sharply decreases at the core/cladding interface. In the case of graded-index, multi-mode fibers, the index of refraction gradually changes across the radius of the core from a maximum at the center to a minimum near the edges.

In one preferred embodiment, optical fiber 12 is a single-mode optical fiber having a core diameter of approximately 9 micrometers ($\mu$m) and a cladding diameter of approximately 125 $\mu$m.

In another preferred embodiment, optical fiber 12 is a graded-index, multi-mode optical fiber having a core diameter of approximately 62.5 $\mu$m and a cladding diameter of approximately 125 $\mu$m.

The primary buffer member 14, which is tightly bonded to each optical fiber 12, provides the first layer of mechanical protection to fiber(s) 12 by cushioning and protecting the fiber(s) when the fiber(s) is bent, cabled, or spooled. As is well known to those skilled in the art, stresses placed upon optical fibers during handling may induce microbending of the fibers, resulting in attenuation of the light, which is intended to pass through them, and thus inefficient signal transmission.

Materials suitable for use in preparing primary buffer member 14 include, but are not limited to, silicones, acrylic polymers, acrylates and polyimides.

For example, primary buffer member 14 may be prepared using acrylate functional monomers and/or oligomers in the form of a polymer coating that is applied to the fiber from a melt or a solution of the polymer, or is extruded onto the fiber. Such buffered fibers have a use temperature ranging from about 85° C. to about 125° C. and can degrade when exposed to temperatures that exceed the upper end of this range during cable manufacture and use, causing undesirable yellowing and even loss of integrity of the coating material.

In a preferred embodiment, optical fiber(s) 12 is a graded-index, multi-mode optical fiber that is buffered with acrylate functional monomers and/or oligomers. Such buffered fibers are available from Corning, Inc., 1 Riverfront Plaza, Corning, N.Y. 14831-0001 ("Corning"), OFS Fitel Denmark I/S, Priorparken 680, DK-2605 Brøndby, Denmark ("OFS Fitel"), and Nufern, Inc., 7 Airport Park Road, East Granby, Conn. 06026-9523 ("Nufern"). Corning and OFS Fitel sell these buffered fibers under the trade designations INFINI-COR buffered fibers and GIGAGUIDE buffered fibers, respectively.

Primary buffer member 14 may also be prepared using polyimides. Polyimide buffered optical fibers have a use temperature ranging from about 150° C. to about 250° C. and thus do not degrade during normal cable manufacture and/or use.

In another preferred embodiment, optical fiber(s) 12 is a graded-index, multi-mode optical fiber that is buffered with a heat-resistant polyimide. Such buffered fibers are available from OFS Fitel.

In yet another preferred embodiment, optical fiber(s) 12 is a radiation hardened, graded-index, multi-mode optical fiber that is buffered with a polyimide.

Such fibers, which are resistant to gamma ($\gamma$-radiation, are available from Nufern.

When a plurality of coated or buffered optical fibers are used, it is s preferred that such fibers take the form of an optical fiber assembly (e.g., ribbon assemblies, cables) to simplify construction and to eliminate the need to handle individual fibers. The fibers in such assemblies are bonded together in a matrix material (e.g., polyester resin), which either encases the fibers or edge-bonds the fibers together. Optical fiber assemblies, comprising single-mode ribbon cables, are available from Sumitomo Electric Lightwave Corp., Sumitomo Electric, 78 TW Alexander Drive, Research Triangle Pa., NC 27709 ("Sumitomo Lightwave"), under the product designation LITEPIPE ribbon cables.

The secondary buffer member 16 provides another layer of mechanical protection to optical fiber 12, preventing damage to the fiber during processing and use. This layer may be formed by either extruding a fluoropolymer material along a portion or length of the primary buffer member 14, or by wrapping a fluoropolymer film, in an overlapping fashion, along a portion or length of member 14.

The secondary buffer member 16 is preferably held tightly against (but not bound to) primary buffer layer 14.

In one embodiment, secondary buffer member 16 is a high-temperature, fluoropolymer buffer member. Fluoropolymers which may advantageously be utilized in the secondary buffer layer 16 of fiber optic cable 10 of the present invention include, for example, FEP, polytetrafluoroethylene-perfluoromethylvinylether (MFA), perfluoroalkoxy (PFA), polytetrafluoroethylene (PTFE), ethylene-chlorotrifluoroethylene (ECTFE) copolymers, ethylene-tetrafluoroethylene (ETFE) copolymers, polyvinylidene fluoride (PVDF), tetrafluoroethylene-hexafluoropropylene-vinylidene fluoride (THV), polyvinylfluoride (PVF) resins, and mixtures thereof.

In a preferred embodiment, secondary buffer member 16 is extruded and the fluoropolymer is either PFA or a copolymer or terpolymer of ETFE. In a more preferred embodiment, the polymer is a high purity, high melt flow, low shrinkage PFA resin. Such resins are available from DuPont under the product designation TEFLON PFA 440 HP-D perfluoroalkoxy resins.

Secondary buffer member 16 preferably has a wall thickness ranging from about 300 $\mu$m to about 350 $\mu$m and an inner diameter ranging from about 240 $\mu$m to about 350 $\mu$m.

Strength member 18 serves to bear most of the force imparted to fiber optic cable 10 by e.g. pulling and other mechanical strains. Strength member 18 exhibits little or no elongation and in a preferred embodiment is prepared from reinforcing materials loosely braided, woven or wound, about the exterior of the secondary buffer member 16. In a more preferred embodiment, the reinforcing materials are straight, axially extending yarns or fibers that circumferentially surround secondary buffer member 16 (e.g., a straight, axial lay-up). Materials suitable for use in this layer include metal (e.g., carbon, carbon steel, copper, brass, stainless steel and alloys thereof) and non-metal (e.g., aramid, glass, polyester, polyimide) reinforcing materials.

In a preferred embodiment, strength member 18 is prepared using aramid yarns or fibers. Aramid yarns or fibers are sold by E. I. du Pont de Nemours and Company, 1007 Market Street, Wilmington, Del. 19898 ("DuPont"), under the trade designations KEVLAR synthetic para-aramid fibers and NOMEX synthetic meta-aramid fibers, and by Teijin Shoji (USA), 42 W 39$^{th}$ St. Fl. 6, New York, N.Y. 10018-3809, USA, under the trade designation TECHNORA para-aramid fibers.

In a more preferred embodiment, strength member 18 is prepared using a fiber-reinforced composite or fabric comprising aromatic polyamide fibers in a resinous matrix, to axially extend and circumferentially surround secondary buffer member 16. Such fiber-reinforced composites or fabrics are available from DuPont under the trade designations KEVLAR 29 and KEVLAR 49 aramid fabrics.

In another preferred embodiment, strength member 18 is prepared using either polyimide films or glass fiber-reinforced composites.

Strength member 18 preferably has a wall thickness ranging from about 300 $\mu$m to about 330 $\mu$m and an inner diameter ranging from about 890 $\mu$m to about 910 $\mu$m.

The dual layer jacket 20 of the fiber optic cable 10 of the present invention comprises a heat or pressure sealed, low-shrinkage polymer film inner layer 22, and an outer protective layer 24.

The polymer film inner layer 22 of dual layer jacket 20, which is held loosely around strength member 18, demonstrates low axial shrinkage and maintains high bond strength between heat or pressure sealed, overlapping film regions even at high temperatures (i.e., greater than or equal to 200° C.), thus serving to increase the dimensional stability of jacket 20.

Films suitable for use in inner layer 22 are heat or pressure sealable, low-shrinkage polymer films prepared from materials including, but not limited to, fluoropolymers and polyimides.

In one preferred embodiment, the low-shrinkage polymer film is a fluoropolymer film.

In another preferred embodiment, the low-shrinkage polymer film is a polyimide film. Any film-forming polyimide may be used in the practice of the present invention, with preferred polyimides being aromatic polyimide films. In a more preferred embodiment, the polyimide film is a polyimide copolymer film derived from the reaction of an aromatic tetracarboxylic acid dianhydride component comprising from 0 to 95 mole %, preferably from 10 to 95 mole %, of 3,3',4,4'-biphenyltetracarboxylic dianhydride and from 5 to 100 mole %, preferably from 5 to 90 mole %, of pyromellitic dianhydride, and an aromatic diamine component comprising from 25 to 99 mole %, preferably from 40 to 98 mole %, of p-phenylene diamine and from 1 to 75 mole %, preferably from 2 to 60 mole %, of a diaminodiphenyl ether such as 4,4'-diaminodiphenyl ether, 3,3'-diaminodiphenyl ether or 3,4'-diaminodiphenyl ether. Such films are described in U.S. Pat. No. 5,731,088 to Philip R. La Court, which is incorporated herein by reference.

The polyimide films used in inner layer 22 are films having a sealable component (i.e., a heat-sealable or pressure sensitive adhesive) coated or laminated on/to at least one surface. It is noted that such films are typically purchased with at least one surface coated with a heat-sealable adhesive, where the coating or lamination of such films constitutes a highly specialized area of practice undertaken by only a limited number of companies.

Heat-sealable adhesives, which may be used in the present invention, include perfluoropolymer, crosslinkable fluoropolymer, and polyimide adhesives.

Perfluoropolymer adhesives, appropriate for use in the present invention, include PTFE, FEP, PFA, and copolymers of tetrafluoroethylene and perfluoromethylvinylether (MFA) adhesives, while suitable crosslinkable fluoropolymer adhesives include ETFE and chlorotrifluoroethylene (CTFE) copolymer and terpolymer adhesives which contain minor amounts of one or more fluorinated comonomers (e.g., HFP, HFIB, PFBE, VDF and VF).

Polyimide adhesives, suitable for use in the present invention, include thermoplastic polyimide adhesives, which soften and become fluid at or above 200° C.

Preferred heat-sealable films are polyimide films coated or laminated with a heat-sealable fluoropolymer adhesive. Such materials are available from DuPont, under the trade designations OASIS 120TWT 561 and OASIS 200TRT515 heat-sealable composite films. Most preferred heat-sealable films are polyimide films coated or laminated with a heat-sealable polyimide adhesive. Such materials are also available from DuPont, under the trade designations KAPTON HKJ, KAPTON EKJ, and ELJ heat-sealable polyimide films.

The heat or pressure sealable films are preferably applied to strength member 18 in tape form, by either spirally or axially wrapping the tape about strength member 18.

For spiral-wrap applications, the tape preferably has a width ranging from about 0.3 to about 1 centimeter (cm), and a thickness ranging from about 0.01 to about 0.04 millimeters (mm). The tape is preferably wrapped so as to achieve a degree of overlap ranging from about 15 to about 70%.

In regard to axial-wrap applications, the tape preferably has a width ranging from about 0.5 to about 1 cm, and a thickness ranging from about 0.01 to about 0.04 mm. For much larger cable applications, such as multiplex cable applications, the tape preferably has a width of from about 110 to about 150% of the cable circumference, and a thickness ranging from about 0.01 to about 0.04 mm. The polyimide tape is preferably wrapped so as to achieve a degree of overlap ranging from about 10 to about 30%.

After a heat-sealable tape is applied to strength member 18, the resulting assembly may be heated (in a separate heating step) to a temperature ranging from about 240 to about 350° C., preferably from about 300 to about 320° C. The purpose of the heating operation is to bond or fuse the overlapping regions of the tape, thereby forming an effective seal against moisture along the length of the inner layer 22. As will be readily apparent to those skilled in the art, such a separate heating step may be unnecessary if the assembly will be exposed to such temperatures during the extrusion of outer layer 24.

The polymer film inner layer 22 exhibits low shrinkage, thereby maintaining the seal and minimizing stress to the optical fibers, which can cause the fibers to crack or break. The term "low shrinkage," as used herein, is intended to mean an axial shrinkage of less than or equal to 0.5%.

The wall thickness of inner layer 22 preferably ranges from about 0.02 mm to about 0.5 mm, while its inner diameter preferably ranges from about 1.4 mm to about 1.8 mm.

Inner layer 22 demonstrates a high temperature (i.e., 150° C.) adhesive bond strength ranging from about 100 to about 250 grams per inch-width (gm/inch-width). When inner layer 22 is prepared using a polyimide film coated or laminated with a heat-sealable polyimide adhesive, it demonstrates a high temperature (i.e., 150° C.) adhesive bond strength of greater than 1000 gm/inch-width, preferably greater than 1500 gm/inch-width. High temperature adhesive bond strength is measured in accordance with ASTM# 1876-00—Standard Test Method for Peel Resistance of Adhesives (T-Peel Test).

The high degree of high temperature adhesive bond strength demonstrated by inner layer 22, when prepared using the preferred heat-sealable films, has been found to be particularly surprising.

Outer protective layer 24 of dual layer jacket 20 serves to protect fiber optic cable 10 from the environment and in a preferred embodiment, to provide cable with flame retardant properties.

Outer layer 24 is preferably prepared using a fluoropolymer material. Fluoropolymers which may advantageously be utilized in layer 24 include, for example, polytetrafluoroethylene-perfluoromethylvinylether (MFA), perfluoroalkoxy (PFA), polytetrafluoroethylene (PTFE), ethylene-chlorotrifluoroethylene (ECTFE) copolymers, ethylene-tetrafluoroethylene (ETFE) copolymers, fluorinated ethylene-propylene (FEP), polyvinylidene fluoride (PVDF), tetrafluoroethylene-hexafluoropropylene-vinylidene fluoride (THV), polyvinylfluoride (PVF) resins, and mixtures thereof.

In a more preferred embodiment, the fluoropolymer of outer protective layer 24 is a PFA fluoropolymer.

The fluoropolymer(s) preferably contains a photosensitive substance (e.g., titanium dioxide), which renders the outer protective layer 24 receptive to laser marking. The term "laser marking," as used herein, is intended to mean a method of marking a fiber optic cable using an intense source of ultraviolet or visible radiation, preferably a laser source. In accordance with this method, exposure of the outer protective layer 24 to such intense radiation will result in a darkening where the radiation was incident. By controlling the pattern of incidence, marks such as letters and numbers can be formed. In a more preferred embodiment, the fluoropolymer(s) contains (as extruded) from about 1 to about 4% by weight, of titanium dioxide.

In addition to the above component, the fluoropolymer(s) may advantageously contain other additives such as antioxidants, crosslinking agents (e.g., triallyl isocyanurate (TAIC), triallylcyanurate (TAC) and trimethallylisocyanurate (TMAIC)), dyes, fibers, lubricants (e.g., PTFE powder), mineral fibers, pigments (e.g., titanium oxide), plasticizers, stabilizers, and the like. However, some such additives may have an adverse effect on the desirable properties of the fiber optic cable 10 of the present invention.

When outer protective layer 24 is prepared using a non-fluoropolymer material, the non-fluoropolymer material preferably contains (as extruded) from about 15 to about 40% by weight of a flame-retarding agent. Suitable flame-retarding agents include aluminum trihydrate, clay, magnesium carbonate, metal hydroxides (e.g., aluminum hydroxide, magnesium hydroxide), talc, and mixtures thereof. In a more preferred embodiment, the flame-retarding agent is magnesium hydroxide, which is available from Kyowa Chemical Industry Co., Ltd., Sakaide, Kagawa 762-0012, Japan, under the product designation KISUMA 5.

Outer layer 24 may be formed by either extruding a fluoropolymer or non-fluoropolymer material along a portion or length of inner layer 22, or by wrapping a fluoropolymer or non-fluoropolymer film, in an overlapping fashion, along a portion or length of layer 22. In a preferred embodiment, outer layer 24 is formed by melt-kneading and extruding a fluoropolymer material onto inner layer 22 using a twin-screw extruder.

Fiber optic cable 10 may be subjected to a so-called "skin irradiation" process to effect crosslinking in the outer protective layer 24. The subject process employs ionizing radiation in the form of accelerated electrons, and basically comprises using an accelerated voltage such that the maximum attained distance of accelerated charged particles is less than or equal to the thickness of the outer layer 24. More specifically, with an applied voltage of 120 KV, most electrons will penetrate outer layer 24 to a maximum depth of approximately 0.20 mm.

The present inventors have found that such a "skin irradiation" process will not serve to damage the optical fiber(s) 12 or the primary buffer member 14.

Such a technique or process is briefly described in JP 4-52570 in regard to automotive low voltage wire coated with e.g. a soft vinyl chloride resin. JP 4-52570 is incorporated herein by reference.

Outer layer 24 of dual layer jacket 20 preferably has a wall thickness ranging from about 0.08 mm to about 0.25 mm, and an inner diameter ranging from about 1.5 mm to about 2.0 mm.

In a more preferred embodiment of the present invention, fiber optic cable 10 comprises:

(1) at least one optical fiber 12;
(2) a primary buffer member 14 comprising a polyimide coating circumferentially surrounding the optical fiber(s) 12;
(3) a secondary buffer member 16 comprising a high temperature fluoropolymer extruded around the primary buffer member 14;
(4) a strength member 18 comprising straight aromatic polyamide fibers axially extending and circumferentially surrounding the secondary buffer member 16; and (5) a dual layer jacket 20 comprising a heat-fused, spirally wrapped, low-shrinkage polyimide tape inner layer 22, and an extruded fluoropolymer outer layer 24.

In yet a more preferred embodiment, fiber optic cable 10 of the present invention further comprises a heat insulating and dimensionally stabilizing member 26. Member 26 is located between the primary and secondary buffer members 14, 16, circumferentially surrounding primary buffer member 14. As its name implies, member 26 performs two functions. First, it serves to insulate the primary buffer member 14 from high processing temperatures used during cable manufacture. For example, when the secondary buffer member 16 is prepared using a high temperature fluoropolymer, temperatures of 350° C. or higher may be used to extrude this material over the primary buffer member 14. As will be readily evident to those skilled in the art, member 26, due to its heat insulating function, allows for the use of a wide variety of primary buffer materials including those materials that may degrade at such high processing temperatures (e.g., acrylates). Second, the heat insulating and dimensionally stabilizing member 26, which is tightly braided, woven or wound about (but not bound to) the exterior of primary buffer member 14, also serves to stiffen and reduce shrinkage of the primary buffer member 14.

In this more preferred embodiment, secondary buffer member 16 is bonded to, or embedded in, heat insulating and dimensionally stabilizing member 26, whereby member 26 also serves to reduce shrinkage in the secondary buffer member 16. Bonding or embedment may be achieved by e.g. extruding the fluoropolymer material of secondary buffer member 16 under vacuum along a portion or length of member 26.

Materials suitable for use in this layer exhibit little or no elongation and include non-metal, heat insulating materials such as aramids, glass, polyesters and polyimides.

In one preferred embodiment, the heat insulating and dimensionally stabilizing member 26 is formed by spirally or cigarette wrapping an aramid paper tape (e.g., NOMEX aramid paper tape), in an overlapping fashion, along a portion or length of the primary buffer member 14.

In another preferred embodiment, the heat insulating and dimensionally stabilizing member 26 is prepared using aramid yarns or fibers. For example, when optical fiber assemblies are employed, member 26 may be prepared by spiral wrapping an aromatic polyamide fiber-reinforced polymer composite or fabric, which comprises helically orientated, aromatic polyamide fibers fixed in a resinous matrix, around the primary buffer member 14. Such fiber reinforced polymer composites are available from DuPont under the trade designations KEVLAR 29 and KEVLAR 49 aramid fabrics.

Heat insulating and dimensionally stabilizing member 26 preferably has a wall thickness ranging from about 0.15 mm to about 0.25 mm and an inner diameter ranging from about 0.24 to about 0.35 mm.

Figure 2:
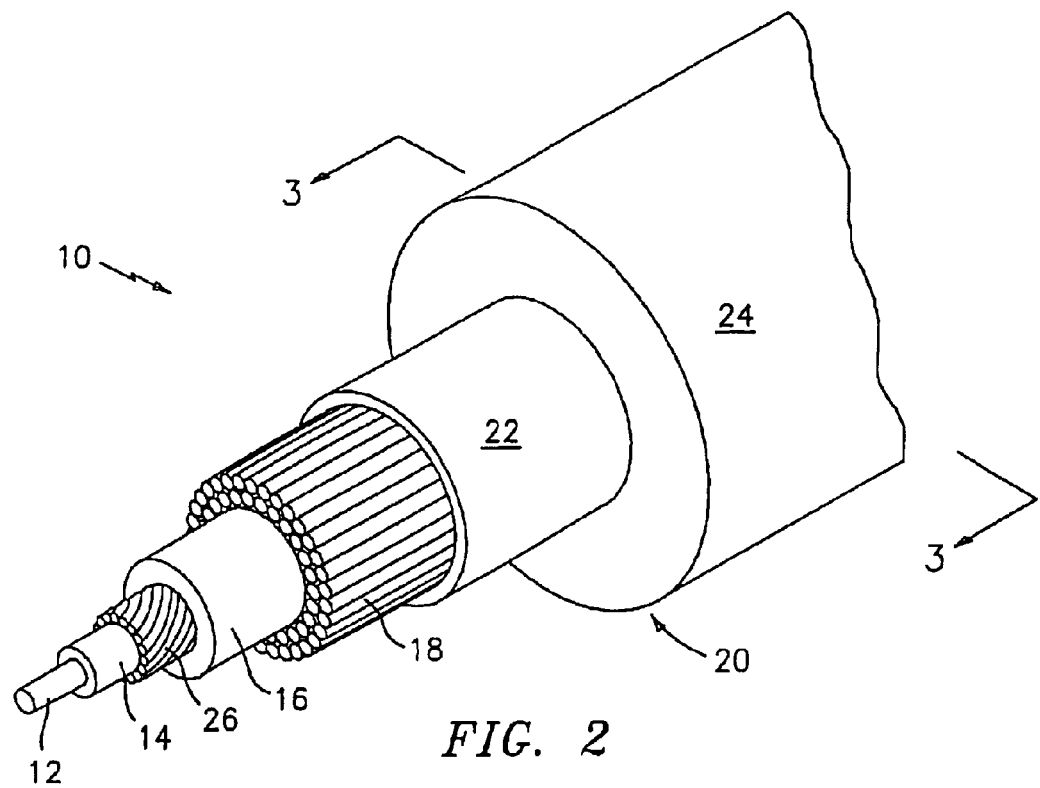
FIG. 2 is a partial side perspective view of a preferred embodiment of the fiber optic cable of the present invention.
Figure 3:
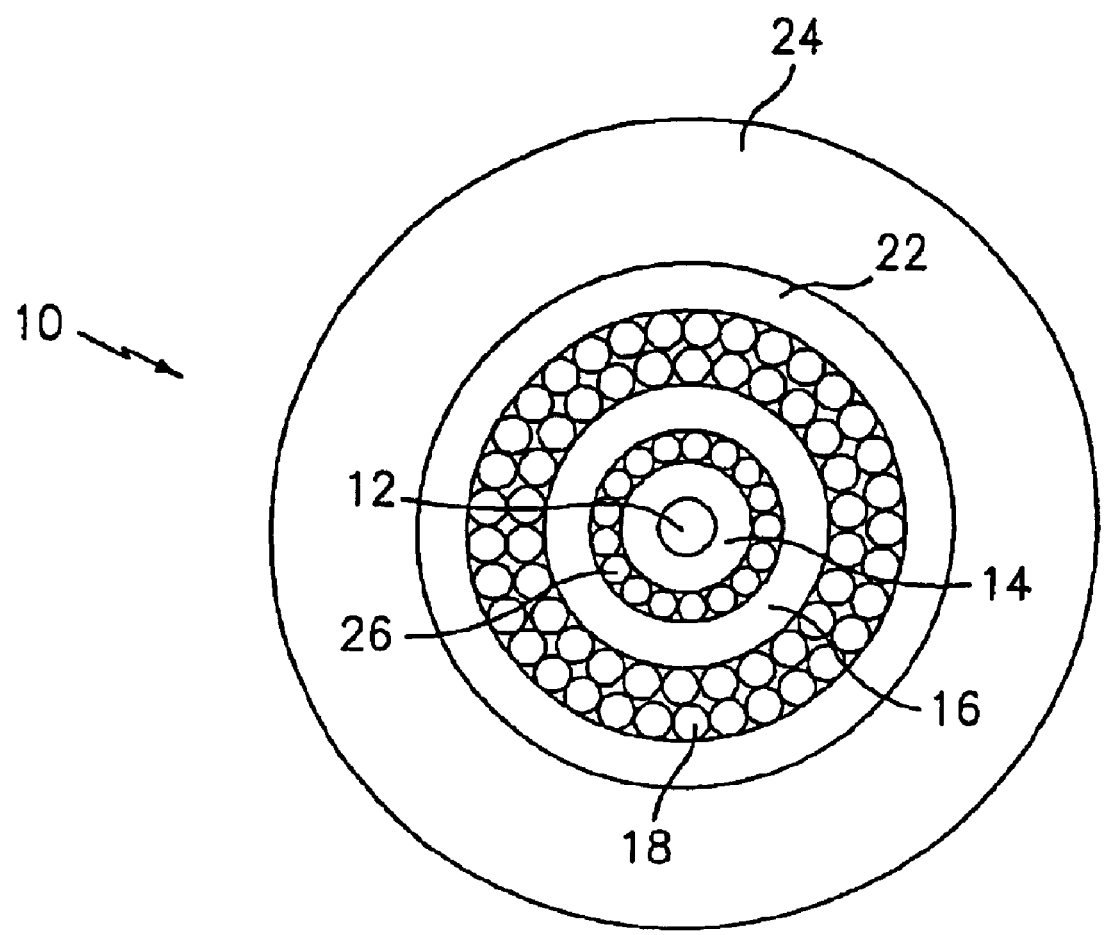
FIG. 3 is an enlarged cross-sectional view of the preferred fiber optic cable shown in FIG. 2, taken along lines 3—3.

In a most preferred embodiment of the present invention, and as best shown in FIGS. 2 and 3, fiber optic cable 10 comprises:

(1) at least one optical fiber 12;

(2) a primary buffer member 14 comprising an acrylate coating circumferentially surrounding each optical fiber 12;

(3) a heat insulating and dimensionally stabilizing member 26 comprising twisted or helically orientated, aromatic polyamide fibers spirally wrapped around the primary buffer member 14;

(4) a secondary buffer member 16 comprising a high temperature fluoropolymer extruded around the heat insulating and dimensionally stabilizing member 26;

(5) a strength member 18 comprising straight aromatic polyamide fibers axially extending and circumferentially surrounding the secondary buffer member 16; and (6) a dual layer jacket 20 comprising a heat-fused, spirally wrapped, low-shrinkage polyimide tape inner layer 22, and an extruded fluoropolymer outer layer 24.

The process for preparing fiber optic cable 10 basically comprises:

(1) forming a primary buffer member 14 on at least one optical fiber 12;

(2) optionally, forming a heat insulating and dimensionally stabilizing member 26 on the primary buffer member 14;

(3) forming a secondary buffer member 16 on either the primary buffer member 14 or the heat insulating and dimensionally stabilizing member 26;

(4) forming a strength member 18 on the secondary buffer member 16; and (5) forming a dual layer jacket 20 on the strength member 18 by
   a. wrapping a low-shrinkage polymer film or tape in an overlapping fashion along a portion or length of the strength member 18,
   b. optionally, heating the low-shrinkage polymer film or tape to a temperature sufficient to cause overlapping regions of the film or tape to bond,
   c. forming an outer protective layer 24 on the inner layer 22, and
   d. optionally, crosslinking the outer protective layer 24.

When the inventive process includes the step of crosslinking the outer protective layer 24, the process may further comprise the step of subjecting the fiber optic cable 10 to thermal treatments to eliminate or further reduce shrinkage in the secondary buffer member 16 and in the outer layer 24 of dual layer jacket 20.

During installation of the inventive fiber optic cable 10, staggered portions of the dual layer jacket 20 (e.g., about 35 mm), the strength member 18 (e.g., about 27 mm), the secondary buffer member 16 (e.g., about 20 mm), and the primary buffer member 14 (e.g., about 13 mm), may be removed to expose a predetermined length of the optical fiber(s) 12. Thereafter, the optical fiber(s) 12 may be bonded to a ferrule followed by the positioning of a connector (e.g., crimp collar) over the exposed portion of the strength member 18. The connector may be mechanically attached to cable 10 by applying sufficient force to deform the connector around the strength member 18 and to effect a seal between the inside surface of the connector and the exposed surface of member 18.

The fiber optic cable 10 of the present invention, which demonstrates improved dimensional stability, has more stable signal carrying characteristics under severe conditions. In other words, the inventive cable 10 minimizes or removes stress when cable 10 is bent or heat cycles on use.

Preliminary testing of a more preferred embodiment of the present invention and a cable employing a single layer jacket has confirmed, as set forth in Table 1 below, that the fiber optic cable of the present invention demonstrates improved dimensional stability in the form of reduced jacket shrinkage and thus reduced optical attenuation in the cable.

Dimensional stability was measured by first exposing the fiber optic cable to a temperature cycling regimen (i.e., temperatures ranging from about −65° C. to about 180° C. for polyimide buffered fibers, temperatures ranging from about −65° C. to about 135° C. for acrylate buffered fibers) using a dynamic mechanical analyzer (DMA) with zero load and measuring jacket shrinkage in accordance with the test procedures detailed in Boeing Standard BMS 13-71 entitled "Draft BMS 13-71 Cable, Fiber Optic" dated Mar. 23, 2002 ("Boeing BMS 13-71"), and in Judd Wire, Inc.'s Standard Operating Procedure (SOP) Number 90111, entitled "Shrinkage Measurement Method", anticipated publication date—Oct. 29, 2003 ("judd SOP 90111"), and then by measuring the stability of optical attenuation in the cable in accordance with the test procedure detailed in Electronic Industries Association (EIA)/Telecommunications Industry Association (TIA) Test Procedure Number 455-3A, dated May 23, 1989 ("EIA/TIA Test Procedure Number 455-3A"), said test procedures being incorporated herein by reference. The results are shown in Table 1, below.

TABLE 1

Summary of Example 1 and Comparative Example C-1

| | | Examples | |
|---|---|---|---|
| | | 1 | C-1 |
| Cable Construction | Construction Material | Outer Diameter | |
| Optical fiber coated with primary buffer | 62.5/125 μm graded-index, multi-mode optical fiber buffered with a heat-resistant polyimide[1] | 125 micrometers | 125 micrometers |
| Secondary buffer | Extruded PFA[2] | 900 micrometers | 900 micrometers |
| Strength member | Aramid fabric[3] | 1.55 millimeters | 1.55 millimeters |
| Dual layer jacket | | | |
| Inner layer | Spirally-wrapped, heat-sealable polyimide film[4] | 1.7 millimeters | |
| Outer layer | Extruded PFA[2] | 2.0 millimeters | |
| Single layer jacket | Extruded PFA[2] | | 2.0 millimeters |
| Dimensional Stability | | | |
| Jacket shrinkage[5] (%) | | 0.10 | 3.30 |
| Attenuation of the cable[6] (dB/km) | | 2.3 | Too high to measure |

[1]manufactured by OFS Fitel under the trade designation Optical Fiber with Polyimide Primary Buffer.
[2]manufactured by DuPont under the trade designation TEFLON PFA 440 HP- D perfluoroalkoxy resins.
[3]manufactured by DuPont under the trade designation KEVLAR 49 aramid fabrics.
[4]manufactured by DuPont under the trade designation KAPTON ELJ heat-sealable polyimide films.
[5]Judd SOP 90111.
[6]EIA/TIA Test Procedure Number 455- 3A.

The results shown in Table 1, demonstrate that when the optical fiber is a 62.5/125 μm graded-index, multi-mode optical fiber, the inventive fiber optic cable (Example 1) demonstrates an optical attenuation of about 2.3 decibels per kilometer (dB/km) at 1300 nanometers (nm), which is dramatically less than the optical attenuation demonstrated by a similar cable jacketed with a single layer of extruded PFA (Example C-1).

More preferred optical attenuations for the inventive fiber optic cables employing one or more 62.5/125 μm graded-index, multi-mode optical fibers, will be less than about 3.0 dB/km at 1300 nm (most preferably, less than about 2.0 dB/km at 1300 nm), while fiber optic cables employing one or more 9/125 μm single-mode optical fibers, will demonstrate an optical attenuation of less than about 2.5 dB/km at 1300 nm (most preferably, less than about 1.5 dB/km at 1300 nm), when tested in accordance with EIA/TIA Test Procedure Number 455-3A.

In addition, inventive fiber optic cable 10 satisfies aerospace industry standards for flame spread and smoke generation, toxicity and out-gassing. More specifically, the inventive cable meets or exceeds the requirements of Boeing BMS 13-71.

While various embodiments of the present invention have been described above, it should be understood that they have been presented by way of example only, and not limitation. Thus, the breadth and scope of the present invention should not be limited by any of the exemplary embodiments.

Having thus described the invention, what is claimed is:
What is claimed is:
1. A fiber optic cable that comprises:
   (a) at least one optical fiber;
   (b) a primary buffer member circumferentially surrounding each optical fiber;
   (c) optionally, a heat insulating and dimensionally stabilizing member circumferentially surrounding the primary buffer member;
   (d) a secondary buffer member circumferentially surrounding and physically contacting an outer surface of either the primary buffer member or the heat insulating and dimensionally stabilizing member;
   (e) a strength member circumferentially surrounding the secondary buffer member; and
   (f) a dual layer jacket circumferentially surrounding and physically contacting an outer surface of the strength member, which comprises a heat or pressure sealed, low-shrinkage polymer film inner layer, and an outer protective layer.
2. The fiber optic cable of claim 1, wherein the primary buffer member is prepared from a material selected from the group of silicones, acrylic polymers, acrylates and polyimides.
3. The fiber optic cable of claim 2, wherein the primary buffer member is prepared from a material selected from the group of acrylate functional monomers, acrylate functional oligomers, and mixtures thereof.
4. The fiber optic cable of claim 2, wherein the primary buffer member is prepared from a polyimide material.

5. The fiber optic cable of claim 1, wherein the secondary buffer member is prepared from a fluoropolymer material selected from the group of fluorinated ethylene-propylene, polytetrafluoroethylene-perfluoromethylvinylether, perfluoroalkoxy, polytetrafluoroethylene, ethylene-chlorotrifluoroethylene copolymers, ethylene-tetrafluoroethylene copolymers, polyvinylidene fluoride, tetrafluoroethylene-hexafluoropropylene-vinylidene fluoride, polyvinylfluoride resins, and mixtures thereof.

6. The fiber optic cable of claim 5, wherein the secondary buffer member is prepared from a perfluoroalkoxy material.

7. The fiber optic cable of claim 5, wherein the secondary buffer member is prepared from an ethylene-tetrafluoroethylene copolymer.

8. The fiber optic cable of claim 1, wherein the strength member comprises straight, axially extending yarns or fibers that circumferentially surround the secondary buffer member.

9. The fiber optic cable of claim 8, wherein the yarns or fibers are aramid yarns or fibers.

10. The fiber optic cable of claim 1, wherein the strength member is prepared using a fiber-reinforced composite or fabric comprising aromatic polyamide fibers in a resinous matrix.

11. The fiber optic cable of claim 1, wherein the strength member is prepared using a polylmide film.

12. The fiber optic cable of claim 1, wherein the strength member is prepared using a glass fiber-reinforced composite material.

13. The fiber optic cable of claim 1, wherein the polymer film inner layer of the dual layer jacket is prepared using a fluoropolymer film.

14. The fiber optic cable of claim 1, wherein the polymer film inner layer of the dual layer jacket is prepared using a polyimide film having a sealable oomponent coated or laminated onto at least one surface thereof.

15. The fiber optic cable of claim 14, wherein the polyimide film is an aromatic polyimide film.

16. The fiber optic cable of claim 15, wherein the aromatic polyimide film is a polyimide copolymer film derived from the reaction of an aromatic tetracarboxylic acid dianhydride component comprising from 0 to 95 mole % of 3,3',4,4'-biphenyltetracarboxylic dianhydride and from 5 to 100 mole % of pyromellitic dianhydride, and an aromatic diamine component comprising from 25 to 99 mole % of p-phenylene diamine and from 1 to 75 mole % of a diaminodiphenyl ether.

17. The fiber optic cable of claim 14, wherein the sealable component is a heat-sealable adhesive selected from the group of perfluoropolymer, crosslinkable fluoropolymer, and polyimide heat-sealable adhesives.

18. The fiber optic cable of claim 17, wherein the heat-sealable adhesive is a perfluoropolymer adhesive selected from the group of polytetrafluoroethylene, fluorinated ethylene-propylene, perfluoroalkoxy, and tetrafluoroethylene and perfluoromethylvinylether copolymer adhesives.

19. The fiber optic cable of claim 17, wherein the heat-sealable adhesive is a crosslinkable fluoropolymer adhesive selected from the group of ethylene-tetrafluoroethylene and chlorotrifluoroethylene copolymer and terpolymer adhesives, which contain minor amounts of one or more fluorinated comonomers.

20. The fiber optic cable of claim 17, wherein the heat-sealable adhesive is a thermoplastic polyimide adhesive, which softens and becomes fluid at or above 200° C.

21. The fiber optic cable of claim 1, wherein the polymer film inner layer of the dual layer jacket demonstrates a high temperature (150° C.) adhesive bond strength (ASTM 1876-00) ranging from about 100 to about 250 grams per inch-width.

22. The fiber optic cable of claim 14, wherein the polyimide film inner layer of the dual layer jacket demonstrates a high temperature (150° C.) adhesive bond strength (ASTM 1876-00) of greater than 1000 grams per inch-width.

23. The fiber optic cable of claim 1, wherein the outer protective layer of the dual layer jacket is prepared using a fluoropolymer material selected from the group of polytetrafluoroethylene-perfluoromethylvinylether, perfluoroalkoxy, polytetrafluoroethylene, ethylene-chlorotrifluoroethylene copolymers, ethylene-tetrafluoroethylene copolymers, fluorinated ethylene-propylene, polyvinylidene fluoride, tetrafluoroethylene-hexafluoropropylene-vinylidene fluoride, polyvinylfluoride resins, and mixtures thereof.

24. The fiber optic cable of claim 23, wherein the fluoropolymer material is a perfluoroalkoxy fluoropolymer.

25. The fiber optic cable of claim 1, wherein the fiber optic cable further comprises a heat insulating and dimensionally stabilizing member that is prepared from a material selected from the group of aramids, glass, polyesters and polyimides.

26. The fiber optic cable of claim 25, wherein the heat insulating and dimensionally stabilizing member is formed by wrapping an aramid paper tape, in overlapping fashion, along a portion or length of the primary buffer member.

27. The fiber optic cable of claim 25, wherein the heat insulating and dimensionally stabilizing member is formed by spiral wrapping an aromatic polyamide fiber-reinforced polymer composite or fabric, which comprises helically orientated, aromatic polyamide fibers fixed in a resinous matrix, around the primary buffer member.

28. The fiber optic cable of claim 1, wherein the optical fiber(s) is a graded-index, multi-mode optical fiber(s) having a core diameter of approximately 62.5 micrometers and a cladding diameter of approximately 125 micrometers, and wherein the fiber optic cable demonstrates an optical attenuation (EIA/TIA Test Procedure Number 455-3A) of less than about 3.0 decibels per kilometer at 1300 nanometers.

29. The fiber optic cable of claim 28, wherein the fiber optic cable demonstrates an optical attenuation (EIA/TIA Test Procedure Number 455-3A) of less than about 2.0 decibels per kilometer at 1300 nanometers.

30. The fiber optic cable of claim 1, wherein the optical fiber(s) is a single-mode optical fiber(s) having a core diameter of approximately 9 micrometers and a cladding diameter of approximately 125 micrometers, and wherein the fiber optic cable demonstrates an optical attenuation (EIA/TIA Test Procedure Number 455-3A) of less than about 2.5 decibels per kilometer at 1300 nanometers.

31. The fiber optic cable of claim 30, wherein the fiber optic cable demonstrates an optical attenuation (EIA/TIA Test Procedure Number 455-3A) of less than about 1.5 decibels per kilometer at 1300 nanometers.

32. A fiber optic cable that comprises:
(a) at least one optical fiber;
(b) a primary buffer member comprising a polyimide coating circumferentially surrounding the optical fiber (s);
(c) a secondary buffer member comprising a high temperature fluoropolymer extruded around and physically contacting an outer surface of the primary buffer member;
(d) a strength member comprising straight aromatic polyamide fibers axially extending and circumferentially surrounding the secondary buffer member; end (e) a dual layer jacket circumferentially surrounding and physically contacting an outer surface of the strength member, which comprises a heat-fused, spirally wrapped, tow-shrinkage polyimide tape inner layer, and an extruded fluoropolymer outer layer.

33. A fiber optic cable that comprises:

(a) at feast one optical fiber;

(b) a primary buffer member comprising an acrylate coating circumferentially surrounding the optical fiber (s);

(c) a heat insulating and dimensionally stabilizing member comprising twisted or helically orientated, aromatic polyamide fibers spirally wrapped around the primary buffer member.

(d) a secondary buffer member comprising a high temperature fluoropolymer extruded around the heat insulating and dimensionally stabilizing member;

(e) a strength member comprising straight aromatic polyamide fibers axially extending and circumferentially surrounding the secondary buffer member; and (f) a dual layer jacket comprising a heat-fused, spirally wrapped, low-shrinkage polyimide tape inner layer, and an extruded fluoropolymer outer layer.

34. A process for preparing a fiber optic cable, which comprises:

(a) forming a primary buffer member on at least one optical fiber:

(b) optionally, forming a heat insulating and dimensionally stabilizing member on the primary buffer member;

(c) forming a secondary buffer member on either the primary buffer member or the heat insulating and dimensionally stabilizing member, wherein the secondary buffer member physically contacts an outer surface of either the primary buffer member or the heat insulating and dimensionally stabilizing member;

(d) forming a strength member on the secondary buffer member; and (e) forming a dual layer jacket on the strength member by
  i. wrapping a low-shrinkage polymer film in an overlapping fashion along a portion or length of the strength member.
  ii. optionally, heating the low-shrinkage polymer film to a temperature sufficient to cause overlapping regions of the film to bond,
  iii. forming an outer protective layer on the inner layer, and
  iv. optionally, crosslinking the outer protective layer.

* * * * *